(12) United States Patent
Melen

(10) Patent No.: US 6,320,979 B1
(45) Date of Patent: Nov. 20, 2001

(54) DEPTH OF FIELD ENHANCEMENT

(75) Inventor: Roger D. Melen, Los Altos Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/167,641

(22) Filed: Oct. 6, 1998

(51) Int. Cl.$^7$ ..................................................... G06T 5/50

(52) U.S. Cl. ........................... 382/154; 382/255; 382/275

(58) Field of Search ..................................... 382/154, 148, 382/151, 173, 255, 275, 294, 299, 318; 348/50; 359/368, 377, 384, 381, 376, 378, 372, 369

(56) References Cited

U.S. PATENT DOCUMENTS

| 3,623,811 | 11/1971 | Lederer et al. | 356/4 |
| 3,682,071 | 8/1972 | Hosoe | 95/44 C |
| 3,769,889 | 11/1973 | Wechsler | 95/18 P |

(List continued on next page.)

FOREIGN PATENT DOCUMENTS

WO 96/24875  *  8/1996 (DE) .............................. G02B/21/22

OTHER PUBLICATIONS

Kazufumi Kanada et al., Image Processing and Systhesis for Extended Depth of Field of Optical Microscopes, The Visual Computer, Springer–Verlag, 1992, pp. 351–360.*

Byron Willis et al., Developments in Three–Dimensional Stereo Brightfield Microscopy, Microscopy Research and Technique, 24:437, 1993, pp. 437–451.*

R. J. Pieper et al., Image Processing for Extended Depth of Field, Applied Optics, vol. 22, No. 10, 1983, pp. 1449–1453.*

Shinya Inoue et al., Video Microscopy, ISBN 0–306–42120–8, 1986, pp. 232 418–422.*

Dale E. Newbury et al., Advanced Scanning Electron Microscopy and X–Ray Microanalysis, ISBN 0–306–42140–2, 1986, pp. 236.*

H. N. Southworth, Introduction to Modern Microscopy, ISBN 0–85109–470–8, 1975, pp. 28–29.*

Zhizhuo, W., "From Photogrammetry to Geomatics—a Commemoration of the Accomplishment that is VirtuoZo", The VirtuoZo Manuscript, http://www.squirrel.com.au/virtuozo/Manuscript/wang.html, Dec. 18, 1997, Australia.

(List continued on next page.)

Primary Examiner—Leo Boudreau
Assistant Examiner—Brian P. Werner
(74) Attorney, Agent, or Firm—Fenwick & West LLP

(57) ABSTRACT

A lens system (100) and image plane (104) are used to capture a number of sample images (400) of a three dimensional scene, each sample image (400) corresponding to a different object distance (106). The in-focus portions of each of the sample images (400) are then merged into a composite image (620) which appears to have a depth of field greater than any of the sample images (400). In one embodiment, the lens system (100) is movably attached to a camera housing (302) such that a motor (304) can move the lens system (100) in the direction of the central axis of the lens system (100). A two dimensional array (300) of photosensors is mounted in the camera along the central axis of the lens system (100). As the lens system (100) is traversed along the central axis, points at various distances in front of the lens system (100) pass in and out of focus on the array (300) of photo-sensors. Image information is captured from the array (300) as it is traversed, producing a series of depth-differentiated sample images (400). The in-focus portion of each sample image (400) is identified through contrast analysis. The in-focus portions identified are added to produce a composite image (620) of the scene exhibiting an apparently large depth of field.

18 Claims, 7 Drawing Sheets

U.S. PATENT DOCUMENTS

| | | | |
|---|---|---|---|
| 3,875,401 | 4/1975 | Stauffer | 250/201 |
| 3,883,251 | 5/1975 | Helava | 356/203 |
| 3,896,304 | 7/1975 | Aoki et al. | 250/201 |
| 3,953,863 | 4/1976 | Lang | 354/25 |
| 4,650,282 | 3/1987 | Lo | 350/130 |
| 4,661,986 * | 4/1987 | Adelson et al. | 382/41 |
| 5,249,035 | 9/1993 | Yamanaka | 356/376 |
| 5,347,363 | 9/1994 | Yamanaka | 356/376 |
| 5,390,024 | 2/1995 | Wright | 356/376 |
| 5,432,712 | 7/1995 | Chan | 364/514 R |
| 5,448,322 | 9/1995 | Bacs, Jr. | 354/112 |
| 5,455,689 | 10/1995 | Taylor et al. | 358/450 |
| 5,475,422 | 12/1995 | Mori et al. | 348/48 |
| 5,495,576 | 2/1996 | Ritchey | 395/125 |
| 5,506,654 * | 4/1996 | Kim | 354/409 |
| 5,510,831 | 4/1996 | Mayhew | 348/47 |
| 5,539,572 * | 7/1996 | Greenberg et al. | 359/368 |
| 5,557,323 * | 9/1996 | Kajiwara | 348/140 |
| 5,644,651 | 7/1997 | Cox et al. | 382/154 |
| 5,655,033 | 8/1997 | Inoguchi et al. | 382/293 |
| 5,680,474 | 10/1997 | Iijima et al. | 382/154 |
| 5,856,844 * | 1/1999 | Batterman et al. | 348/207 |
| 6,201,899 * | 3/2001 | Bergen | 382/284 |

OTHER PUBLICATIONS

Roux, M., "Cartography Updating", http://www–ima.en-st.fr/active_96/en/node42.html, Mar. 24, 1998, France.

Dupéret. A., "Automatic Derivation of a DTM to Produce Countour Lines", http://dgrwww.epfl.ch/PHOT/publicat/wks96/Art_3_2.htmn, Mar. 24, 1998, France.

What is Confocal Microscopy? http://gonzo.sci.man.ac.uk/Confocal/whatis/whatis.html, pp. 1–3, Mar. 24, 1998, United Kingdom.

Huxley, I., "3D View v1.01", A Quick and Easy Way to Visualize Confocal Reflection Datasets on the Mac, Department of Physical Optics, University of Sydney, pp. 1–3, http://www.physics.usyd.edu.au/physopt/3dview/, Jun., 1997, Sydney, Australia.

* cited by examiner

DEPTH OF FIELD ENHANCEMENT

FIELD OF INVENTION

This invention pertains to the field of image focus enhancement. More specifically, this invention pertains to using information from multiple images to construct an image with an apparently enhanced depth of field. The invention is preferably implemented in a digital computer.

BACKGROUND OF THE INVENTION

Depth of field is a measurement of the range of depth along a view axis corresponding to the in-focus portion of a three dimensional scene being imaged to an image plane by a lens system. Several parameters of a lens system influence the depth of field of that lens system. In general, optical systems with high magnification, such as microscopes, have small depths of field. Also, optical systems which use large aperture lens systems to capture more light generally have small depths of field.

In some situations it is desirable to have the benefits of a larger depth of field without giving up those optical qualities which generally result in small depths of field. For example, some analyses of microscopic specimens would be aided by the availability of a high magnification microscope with a relatively large depth of field. Such a microscope could be used to more clearly image the full structure of a microscopic object which is three dimensional in nature. Ordinary microscopes generally allow the clear viewing of a thin section of such a three dimensional specimen, due to the small depth of field of those microscopes. Portions of the specimen which are on either side of the in-focus section will be out of focus, and will appear blurry. The ability to clearly see the full three dimensional structure of a specimen would aid in the understanding of the structure of that specimen. This would be especially useful when used in conjunction with biojective microscopes which allow a user to view a specimen stereoscopically.

Another situation in which a small depth of field can pose problems is the low light photography of a scene with large depth variations. An example of this is a landscape scene including foreground objects photographed at night. In order to get sufficient light onto the film at the image plane of the camera, a large aperture lens must generally be used. A large aperture lens, however, will result in a relatively small depth of field. Because of the small depth of field, only a portion of the scene being photographed will be in focus.

A conventional method of imaging the depth information of a three dimensional microscopic scene is confocal microscopy. In confocal microscopy a single photodetector is situated behind a pinhole in an opaque screen. An objective lens focuses light from an illuminated point onto the pinhole, and the screen masks out any non-focused light. The illuminated point is generally illuminated by an intense, focused light source, such as a laser. The illuminating light source and the pinhole must be scanned over a microscopic specimen, either one point at a time or in a series of lines, in order to build up information for the whole region of interest. Depth information can be extracted from the data recorded by the photodetector. The information obtained from a confocal microscope can be used to image the three dimensional structure of microscopic specimens, but such a system is too complex and expensive for typical microscopy. Also, confocal microscopy is limited to situations in which microscopic specimens are being imaged, and is not practical for imaging macroscopic scenes.

What is needed is a system capable of producing an image of a three dimensional scene with enhanced focus over a large depth of field, without sacrificing optical qualities which ordinarily require a small depth of field.

SUMMARY OF THE INVENTION

A lens system (100) and image plane (104) are used to capture a number of sample images (400) of a three dimensional scene, each sample image (400) having a is depth of field which is smaller than desired. Each sample image (400) corresponds to a different object distance (106), which is the distance from the objective lens of the lens system (100) to the plane in the scene that is focused on the image plane (104). The in-focus portions of each of the sample images (400) are merged into a composite image (620) that appears to have a depth of field greater than any of the sample images (400). Because the sample images (400) can each have an arbitrarily small depth of field, the lens system (100) can have a large aperture, and the scene can be highly magnified by the lens system (100). The optical qualities which ordinarily result in a small depth of field are retained in an image (620) having apparently deep focus.

In one embodiment, the lens system (100) is movably attached to a camera housing (302) such that a motor (304) can move the lens system (100) in the direction of the central axis of the lens system (100). A two dimensional array (300) of photo-sensors is mounted in the camera (308) along the central axis of the lens system (100). As the lens system (100) is traversed along the central axis, points at various distances in front of the lens system (100) pass in and out of focus on the array (300) of photo-sensors. Image information is captured from the array (300) as it is traversed, producing a series of depth-differentiated sample images (400).

The in-focus portion of each sample image (400) is identified through contrast analysis. The in-focus portions thus identified are combined to produce a composite image (620) of the scene exhibiting an apparently large depth of field.

DETAILED DESCRIPTION OF THE PREFERRED EMBODIMENTS

Figure 1:
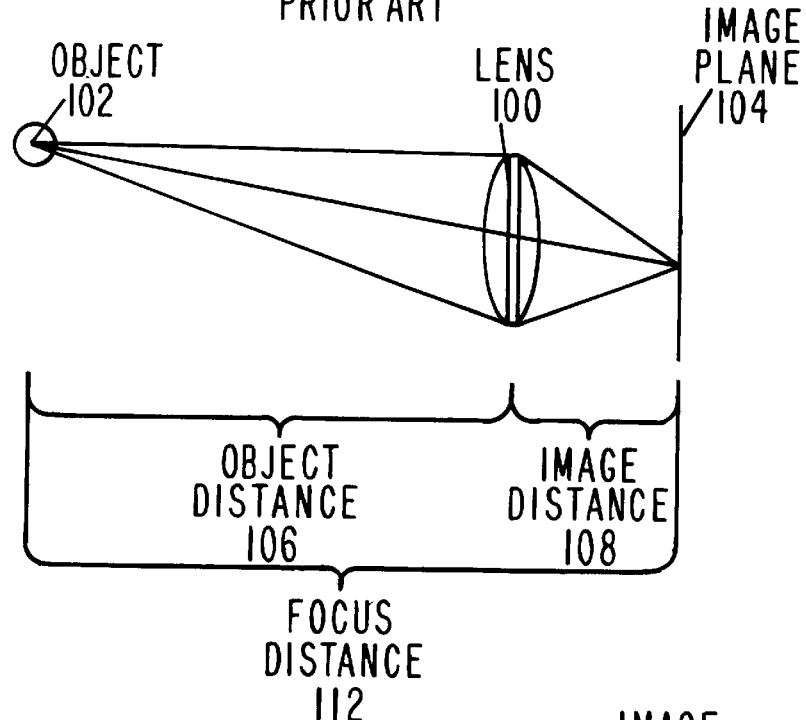
FIG. 1 is an illustration of a lens system 100 focusing light from an object 102 onto an image plane 104.

Referring now to FIG. 1, converging lens system 100 is shown focusing light from object 102 onto image plane 104. Lens system 100 can be a single convex lens or a series of lenses. Alternately, lens system 100 can be a focusing mirror system which performs essentially the same function of an imaging lens system 100. Object 102 is located a distance 106 in front of lens system 100. Distance 106 is referred to as object distance 106, or $d_o$. Light from object 102 is focused on image plane 104, which is distance 108 behind lens system 100. Distance 108, which is dependent upon the characteristics of lens system 100 and object distance 106, is referred to as image distance 108, or $d_i$. Light from an object 102 an infinite distance in front of lens system 100 will be focused on image plane 104 when it is a distance behind lens system 100 which corresponds to the focal length of lens 100. Focal length is represented by the variable f, and is a fixed property of lens system 100. The mathematical relationship between $d_o$, $d_i$ and f is expressed in Equation 1:

$$\frac{1}{d_i} + \frac{1}{d_o} = \frac{1}{f} \qquad \text{Eq. 1}$$

As used herein, focus distance 112 is the sum of $d_o$ and $d_i$, represented by $d_f$.

Figure 2:
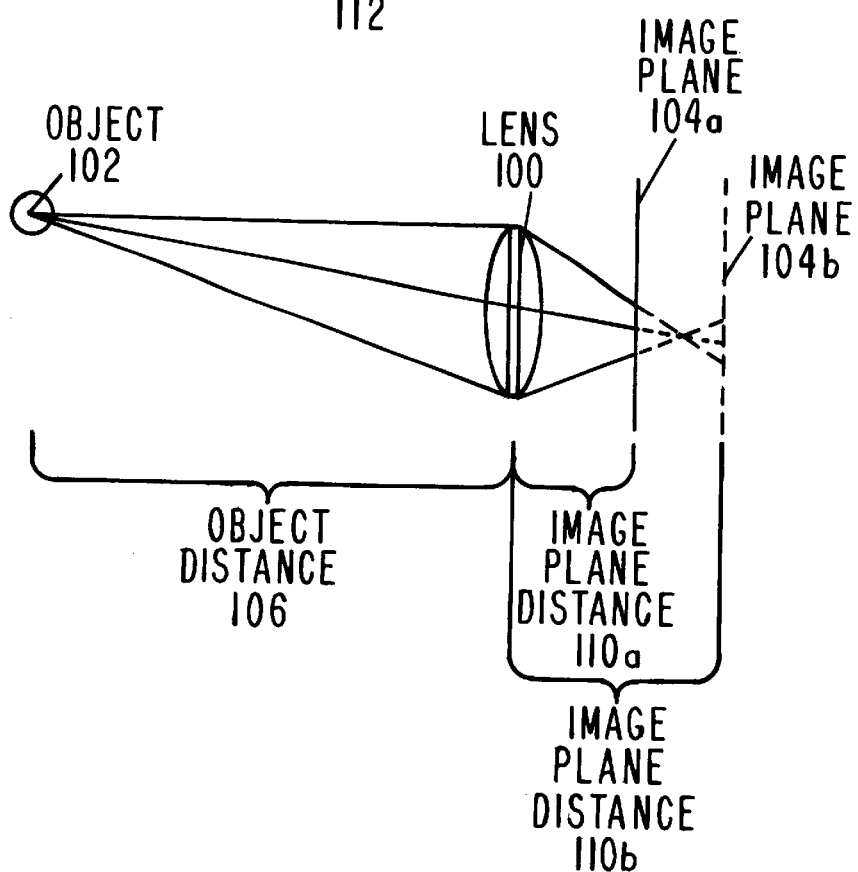
FIG. 2 is an illustration of two examples of an object 102 which is out of focus on an image plane 104.

As illustrated in FIG. 2, for an object 102 at a particular object distance 106, if image plane 104 is closer to or further from lens system 100 than image distance 108, light from object 102 will not be focused on image plane 104. Image plane 104a is closer than image distance 108 to lens system 100, and image plane 104b is further from lens system 100 than image distance 108. The light from object 102 in both cases is spread out over an area on image planes 104a and 104b which is larger than in the case where the distance between image plane 104 and lens system 100 is image distance 108. Due to this lack of focus, the image of object 102 on image planes 104a and 104b has less sharpness, and therefore less contrast, than the image of object 102 which is focused on image plane 104 in FIG. 1. The actual distance between lens system 100 and image plane 104 is image plane distance 110. Distance 110 is the same as distance 108 when object 102 is focused on image plane 104.

Contrast in an image of object 102 will be highest, in general, when object 102 is focused, because light coming from a point on object 102 is spread over a larger area in less focused images. If the contrast at a single region of image plane 104 is monitored as image plane distance 110 is varied, the measured contrast will generally reach a maximum when image plane distance 110 equals image distance 108 for an object 102 being imaged at that region of image plane 104.

Figure 3A:
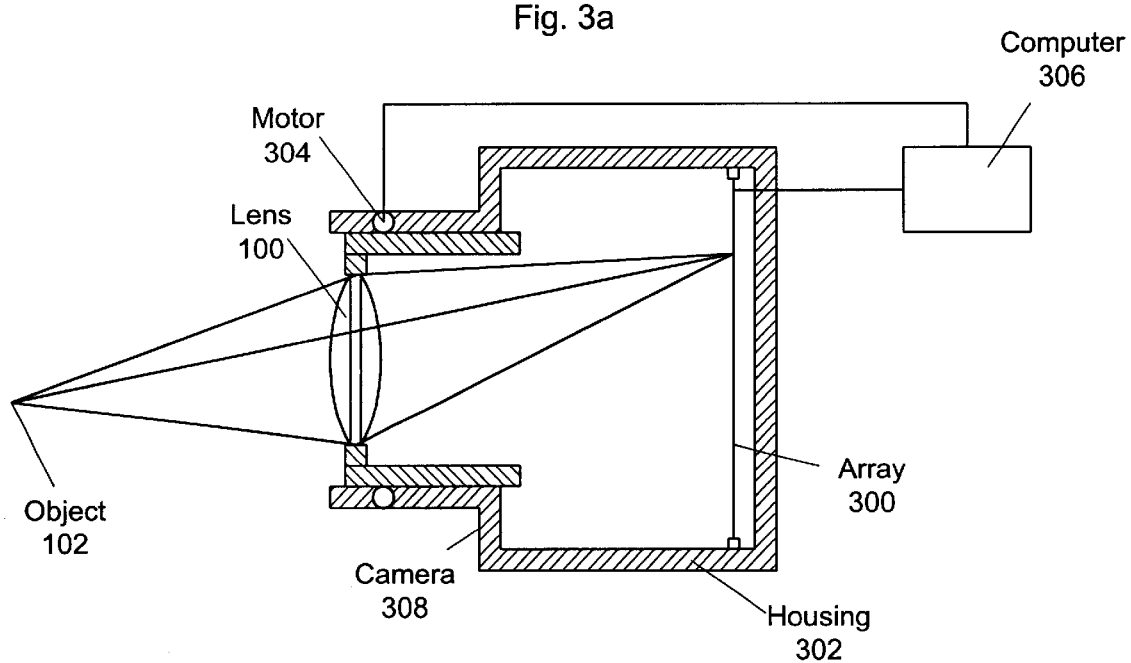
FIGS. 3a and 3b illustrate a camera 308 used in one embodiment of the present invention.
Figure 3B:
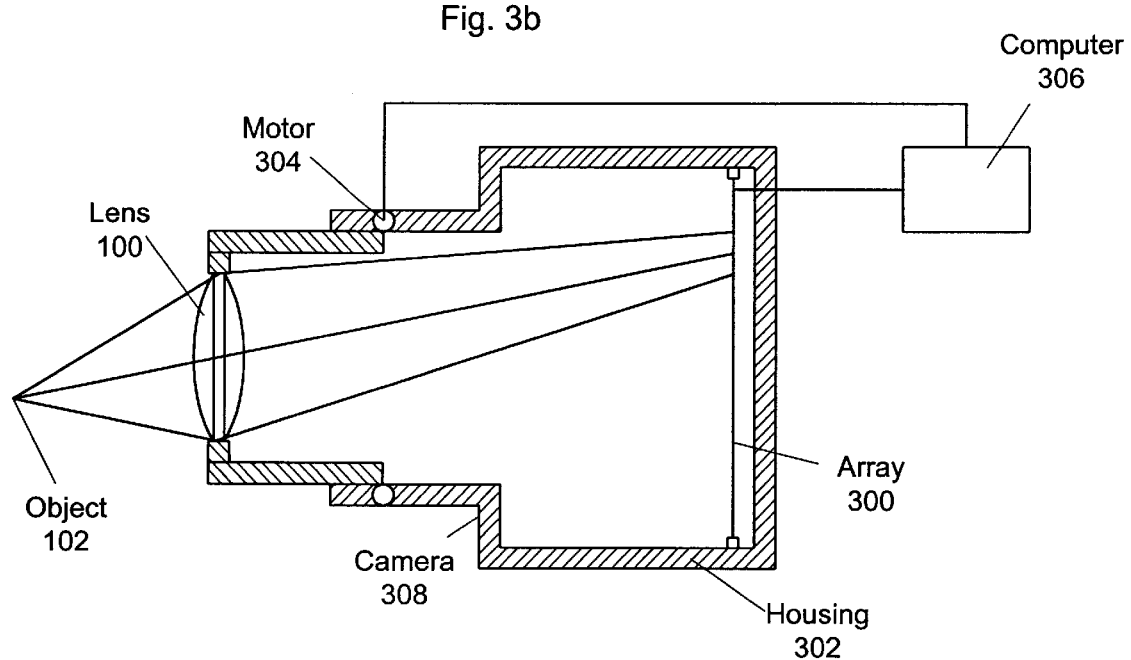

In an exemplary embodiment of the present invention illustrated in FIGS. 3a and 3b, a two dimensional array 300 of photo-sensitive cells is mounted in camera housing 302. In one embodiment, array 300 is composed of Charge-Coupled Device (CCD) cells, such as the 1152 by 1728 cell CCD incorporated in the Canon EOS D2000 digital camera. Lens system 100 is mounted in housing 302 such that motor 304 can move lens system 100 along its central axis. Motor 304 is preferably an ultrasonic motor, such as the UA80 ultrasonic motor produced by Canon Inc. Array 300 is mounted perpendicular to the central axis of lens system 100, in order to receive light that has passed through lens system 100. The components thus assembled in housing 302 constitute camera 308. In the exemplary embodiment described, array 300 is an array of electronic photosensitive elements. In an alternate embodiment, array 300 can be replaced by photographic film which records a series of images 400 which correspond to unique focal distances 112. These photographic images 400 can either be interrogated optically, or scanned into computer 306 and examined in the same manner presented here. Also, wavelengths of light other than the visible spectrum, such as X-rays, can be detected by array 300.

Array 300 senses the intensity and color of light striking each of its cells and transmits this information to computer 306, which is coupled to camera 308. The information transmitted from array 300 to computer 306 indicates the pattern of light striking each cell of array 300 at a sample point in time. This pattern forms an image 400 associated with the sample time. Computer 306 can store several sample images 400 from array 300.

Figure 4A:
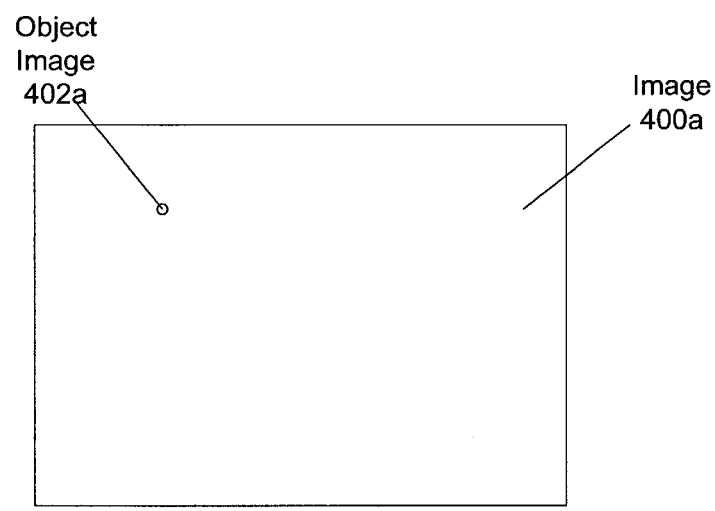
FIGS. 4a and 4b illustrate images 400a and 400b, which were captured by the camera 308 shown in FIGS. 3a and 3b.
Figure 4B:
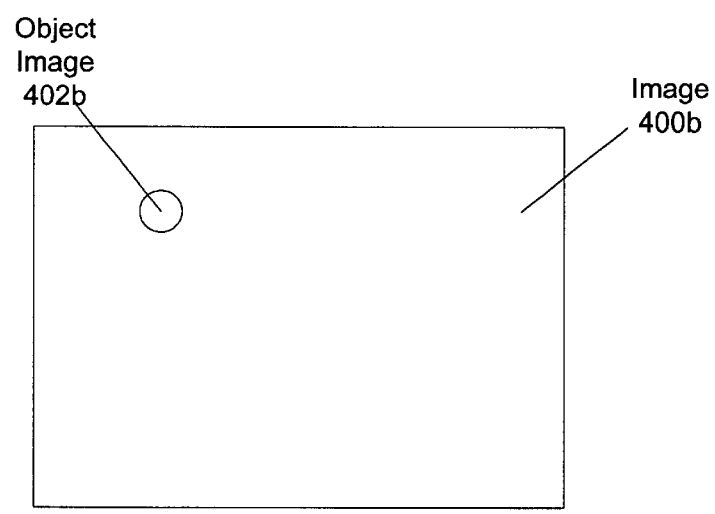
Figure 5:
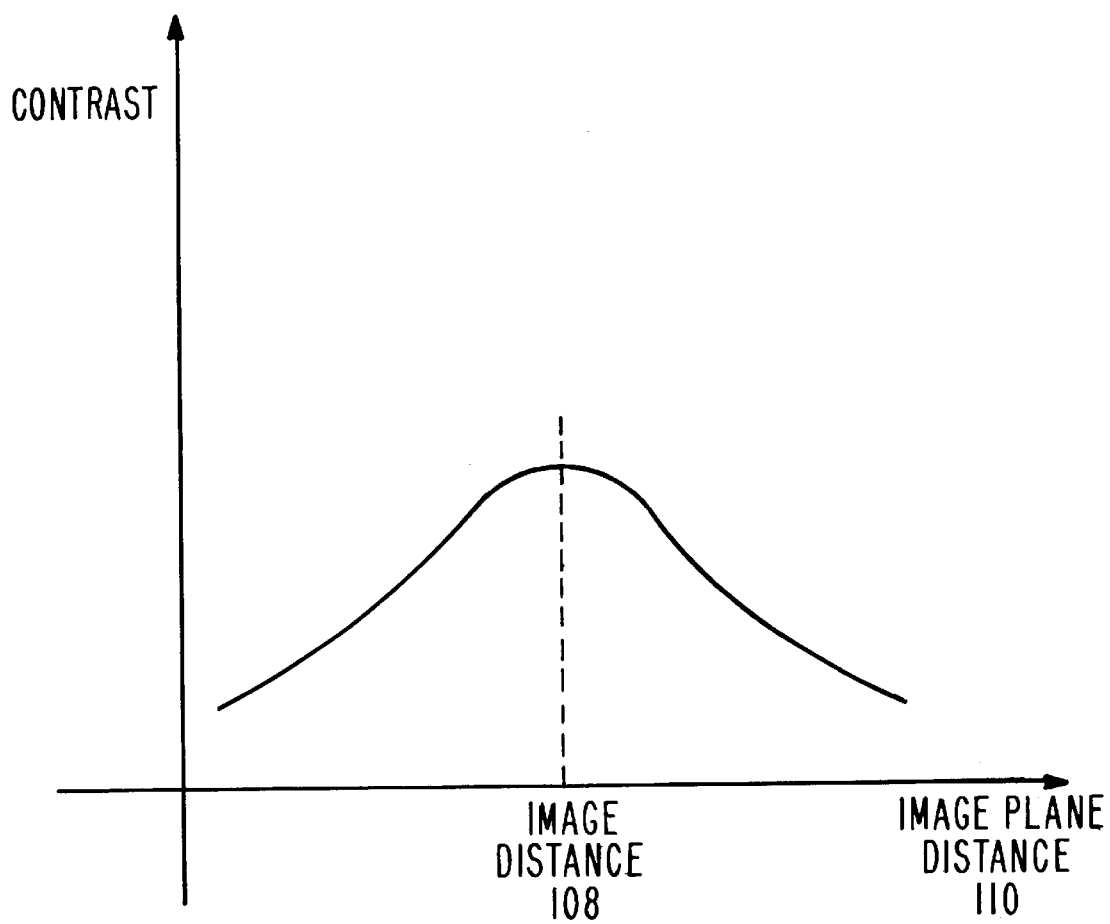
FIG. 5 illustrates a typical variation of image contrast which accompanies a change in image plane distance 110.

Computer 306 is also coupled to motor 304, and computer 306 can send signals to motor 304 which cause lens system 100 to traverse along its central axis, moving closer to, or farther away from array 300. As lens system 100 moves relative to array 300, image plane distance 110 changes, causing object distance 106 and focus distance 112 to change as well. In FIG. 3a, light from small object 102 is focused on array 300, and forms image 400a in FIG. 4a. Object 102 appears as object image 402a in FIG. 4a. In FIG. 3b, lens system 100 is moved such that light from object 102 is not focused on array 300. FIG. 4b illustrates image 400b, which corresponds to the image on array 300 of FIG. 3b. Object image 402b is noticeably larger than object image 402a in FIG. 4a, due to the lack of focus. Unfocused object image 402b will in general exhibit lower contrast than focused object image 402a. A typical relationship between image plane distance 110, image distance 108, and contrast is illustrated in FIG. 5.

Figure 6:
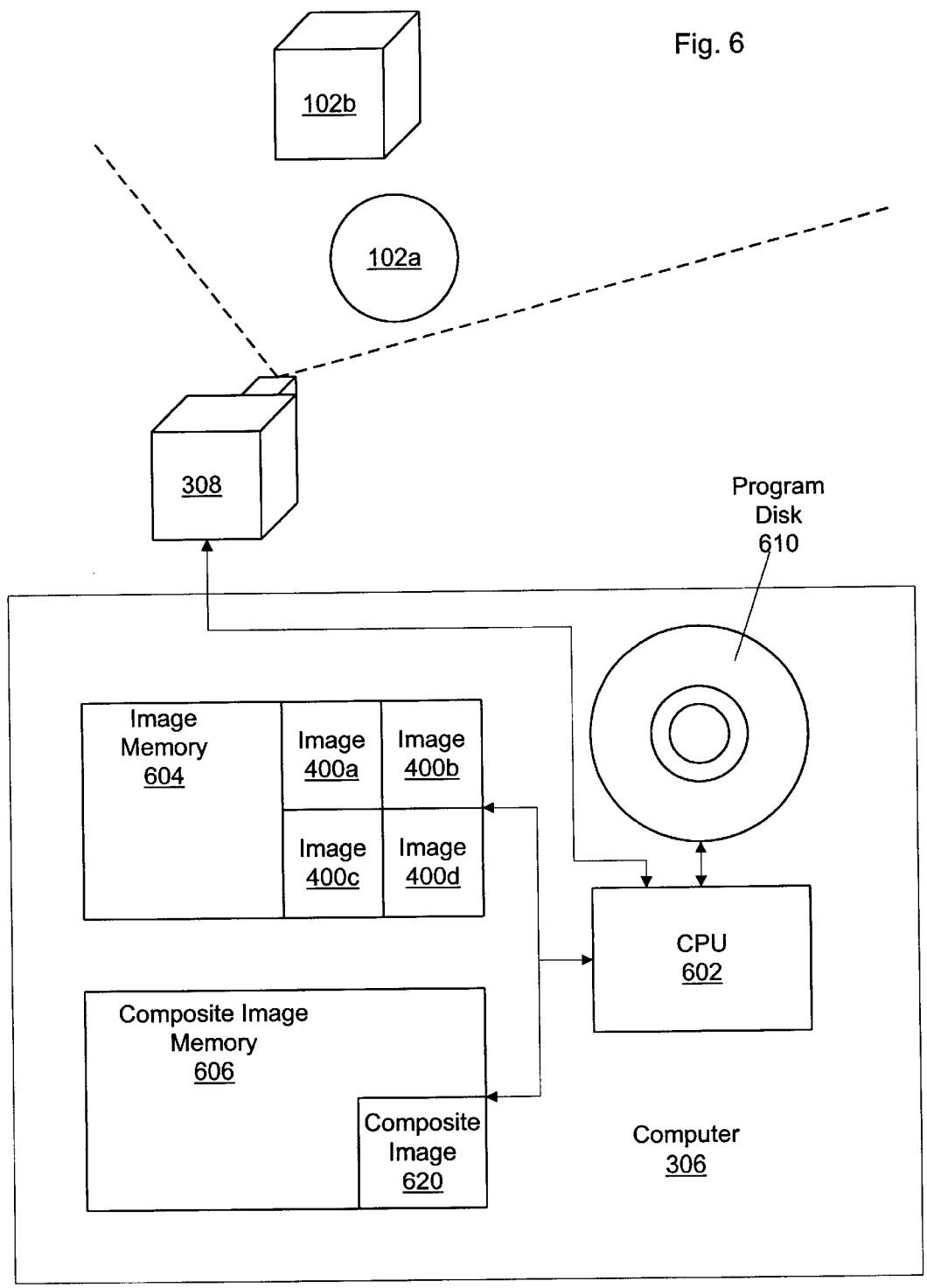
FIG. 6 illustrates an embodiment of the present invention.

Referring now to FIG. 6, the operation of an exemplary embodiment is described. Computer 306 includes central processing unit (CPU) 602. CPU 602 is coupled to image memory 604, composite image memory 606, camera 308, and program disk 610. Program disk 610 in the exemplary embodiment is a magnetic storage medium, and contains program instructions for CPU 602. Other forms of storage for the computer instructions will be apparent to those skilled in the art, including optical disk media, random access memory (RAM), and read only memory (ROM) modules. Also, any of the components making up computer 306 can be incorporated directly into camera 308. The program instructions stored on program disk 610 cause CPU 602 to command motor 304 to sweep lens system 100 between two positions. Several times during the sweep, array 300 communicates an image 400 to CPU 602, which stores that image 400 in image memory 604. In FIG. 6, four images 400a–d are shown stored in image memory 604. The number of images 400 that can be stored is a function of the size of images 400 and the size of image memory 604.

Figure 7A:
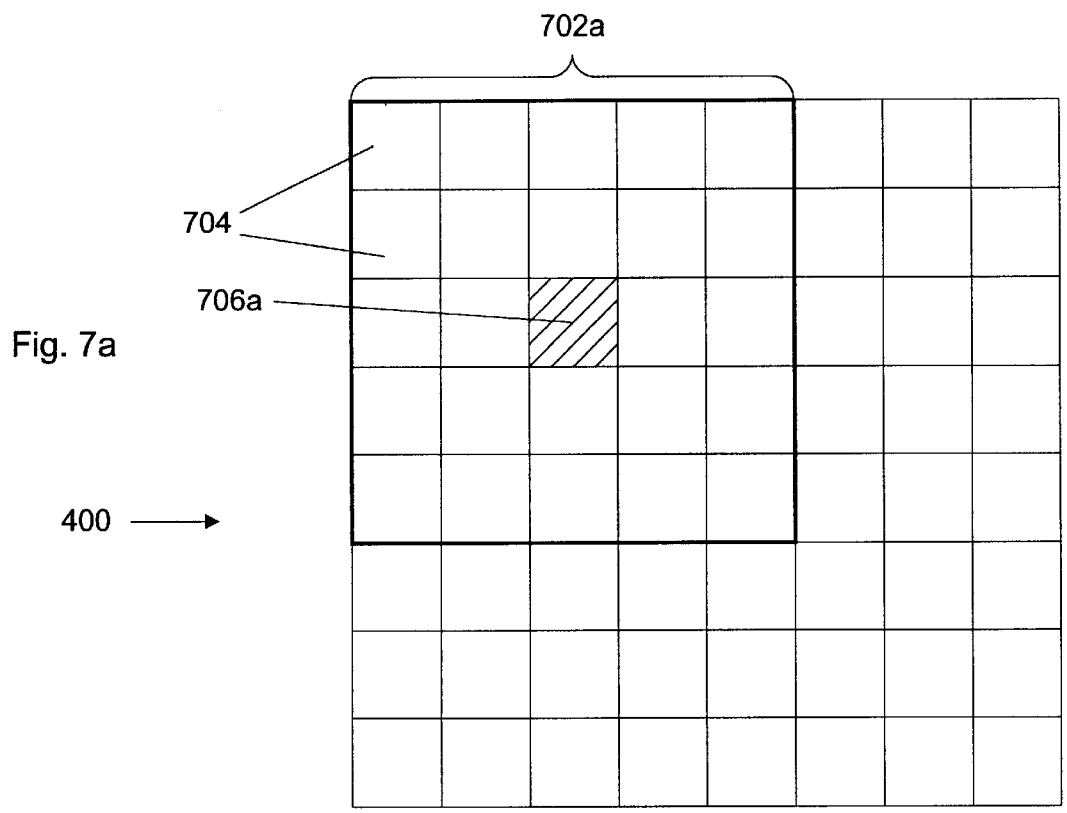
FIGS. 7a and 7b illustrate measurement regions 702 as subsets of pixels 704 of images 400.
Figure 7B:
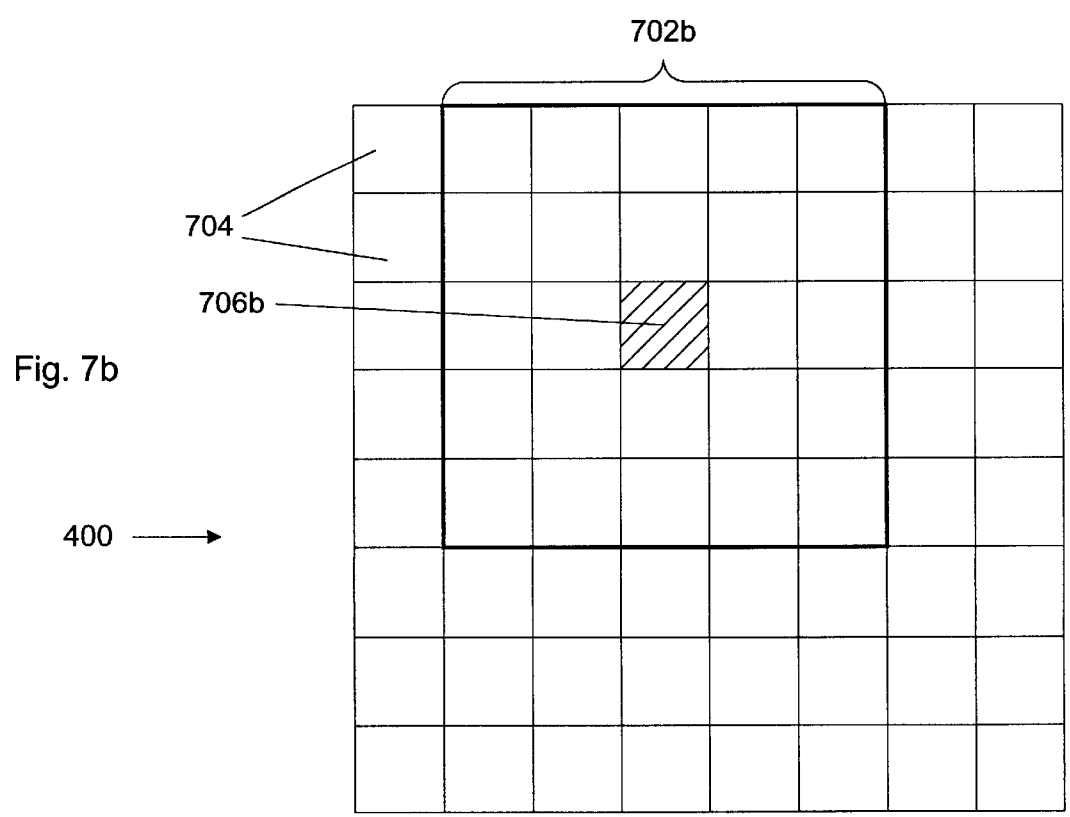

After the sweep, CPU 602 is used to examine the images 400 stored in image memory 604. In alternate embodiments, this examination could be performed concurrently with the sweeping of lens system 100. Also, a processor other than the processor responsible for commanding motor 304 can perform this examination. As illustrated in FIGS. 7a and 7b, during the examination, each image 400 is divided into a number of measurement regions 702, each measurement region 702 encompassing one or more pixel locations 704. Each pixel location 704 ordinarily corresponds to one pixel in each image 400. Each pixel corresponding to a single pixel location 704 represents the same portion of the scene being imaged. Ordinarily, each image 400 will have the same number of pixels, and a single pixel location 704 will correspond to the same pixel offset in each image 400. Where camera 308 moves during the sweeping of lens system 100, or where movement of lens system 100 alters the magnification of the image, each pixel location 704 generally corresponds to different pixel offsets within each image 400. In such cases, either each image 400 is altered, using conventional image processing techniques, to put pixels and pixel locations 704 into one-to-one correspondence, or the examination takes into account the varying pixel offsets in each image 400.

In an exemplary embodiment, the image contrast in each measurement region 702 is calculated. One example of such a calculation is to assign to each measurement region 702 a contrast value which is based on the ratio of the brightest pixel value in region 702 to the darkest pixel value in region 702. The calculated contrast is assigned to image 400 at a location corresponding to the centroid of measurement region 702. In this embodiment, the calculated contrast value is assigned to the pixel location 704 which coincides with the centroid 706 of measurement region 702, indicated in FIGS. 7a and 7b by the shaded pixel location. In other embodiments, the calculated contrast value can be assigned to a region which is larger than one pixel 704.

After this is done for one measurement region 702, it is repeated for as many other measurement regions 702 as there are in image 400. A measurement region 702 can contain some of the same pixels 704 as another measurement region 702. In FIG. 7b, measurement region 702b contains many of the same pixels as measurement region 702a in FIG. 7a. The offset between measurement regions 702a and 702b in FIGS. 7a and 7b is just one pixel location 704, because in this embodiment contrast values are calculated at a resolution of one contrast value per pixel location 704, even though measurement regions 702 are much larger than one pixel location 704. Different size measurement regions 702 can be used, as different images 400 have different contrast characteristics. For example, with an image 400 of many thin dark lines against a light background, the most accurate results will generally be obtained from small measurement regions 702. An image 400 of larger objects with less contrast will generally yield better results with larger measurement regions 702.

Figure 8:
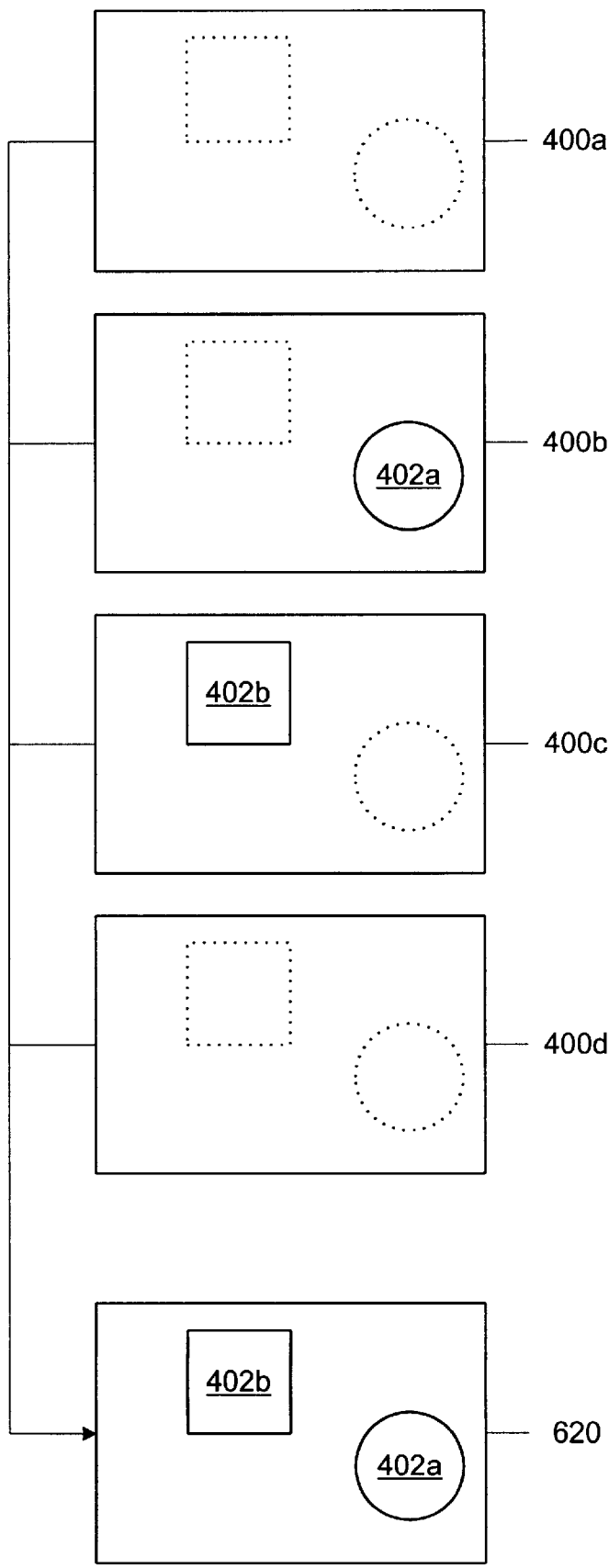
FIG. 8 illustrates a series of images 400a-d used to construct composite image 620.

This calculation of contrast for each measurement region 702 is performed for each image 400 stored in image memory 604. Then, for each measurement region 702, that image 400 with the maximum contrast for the measurement region 702 is determined. This image 400 is assumed to be the image 400 which was captured when image plane distance 110 was most nearly equal to image distance 108 for the object 102 imaged at measurement region 702. Referring now to FIG. 8, the regions of each image 400a -d which are determined to be most in focus are identified as regions 402 with solid lines, and out-of-focus regions are illustrated with dotted lines. Some images, such as 400a and 400d, do not contain any in-focus regions 402. Other images, such as 400b and 400c, do contain in-focus regions 402 which comprise part of the scene being imaged. The in-focus regions 402 are combined by CPU 602 in composite image 620, which is stored in composite image memory 606.

An alternate embodiment of the invention uses measurement regions 702 which each comprise only one pixel location 704. Because one pixel location 704 does not contain enough information for a contrast calculation, the brightness of the pixel in that pixel location 704 for each image 400 is examined. As previously discussed, at the point where image plane distance 110 equals image distance 108, there will generally be maximum contrast at measurement region 702. This point of maximum contrast will generally coincide with a point of either maximum or minimum brightness. In this embodiment, an in-focus region 402 includes that collection of pixel values in an image 400 which are either a maximum or a minimum brightness compared to pixels of the same pixel location 704 in other images 400. These pixel values are added to composite image 620 at their pixel locations 704.

In one embodiment, each image 400 corresponds to a single focus distance 112. This requires motor 304 to start and stop repeatedly, pausing for an image 400 to be captured at each focus distance 112. In another embodiment, motor 304 moves lens system 100 in a single, smooth movement with images 400 being captured while it is moving. The images 400 thus captured do not correspond to a single focus distance 112, since focus distance 112 changes while image 400 is being captured, but pixels near each other do correspond to similar focal distances 112. If the difference in focal distances 112 for pixel locations 704 of the same measurement region 702 is small, contrast measurements can be relatively accurate. In general, smaller measurement regions 702 will be less susceptible to skew in focal distance 112 due to the movement of lens system 100. If differences in focal distances 112 are too large, in-focus regions 402 can be calculated using brightness information for each pixel location 704, rather than using multi-pixel measurement regions 702.

The above description is included to illustrate the operation of an exemplary embodiment and is not meant to limit the scope of the invention. The scope of the invention is to be limited only by the following claims. From the above description, many variations will be apparent to one skilled in the art that would yet be encompassed by the spirit and scope of the present invention. For example, the infocus regions 402 can be identified through other methods, such as stereoscopic disparity measurements and object-based methods.

What is claimed is:

1. A method for using an imaging system and an array of sensor locations to construct a composite image of a three dimensional scene, the array of sensor locations defining an image plane on which is focused an image of points a focus distance in front of the image plane, the method comprising the steps of:
   moving the imaging system relative to the image plane so as to change the focus distance;
   at each sensor location of the array, for at least two distinct focus distances:
      sensing radiation which has passed through the imaging system;
      producing image information based on the sensed radiation including a brightest pixel value and a darkest pixel value;
      calculating a contrast value as a ratio of the brightest pixel value within the sensor location to the darkest pixel value within the sensor location; and
      assigning the calculated contrast value to a plurality of pixels within the sensor location;
   recording the image information; and
   constructing a composite image by incorporating into said composite image, for each sensor location, image information from that focus distance which produces the maximum contrast.

2. The method of claim 1, wherein the imaging system comprises one of a lens system and a mirror system.

3. The method of claim 1, wherein the imaging system comprises a convex lens.

4. The method of claim 1, wherein the radiation is sensed at each sensing location by one of a Charge Coupled Device (CCD) cell, a photosensitive film region, and an X-ray film region.

5. The method of claim 1, wherein the radiation is one of visible light and X-ray radiation.

6. The method of claim 1 wherein the radiation is sensed by photosensitive film, and a separate frame of film is exposed for each position of the imaging system relative to the image plane.

7. The method of claim 1 wherein each sensor location contains at least one pixel that is also contained within at least one other sensor location.

8. A method for using at least two sample images of a three dimensional scene to construct a composite image of the scene, each of the sample images corresponding to a unique focus distance, the method comprising the steps of:

for each sample image and for each of at least two measurement regions, each measurement region corresponding to a portion of the scene represented in the sample images, determining contrast information as a ratio of a brightest pixel value within each measurement region to a darkest pixel value within each measurement region, and assigning the contrast value to a plurality of pixels within each measurement region; and combining image information from all of the sample images, on a measurement region by measurement region basis, based upon which sample image exhibits the maximum contrast for that measurement region, to construct the composite image.

9. The method of claim 8, wherein the sample images are digital images.

10. The method of claim 8, wherein the sample images are photographic images.

11. The method of claim 8, wherein the method is a computer-implemented method.

12. A computer-readable medium containing a computer program for using at least two sample images of a three dimensional scene to construct a composite image of the scene, each of the sample images corresponding to a unique focus distance, the computer program comprising an array of instructions for causing a central processing unit (CPU) to perform the steps of:

for each sample image and for each of at least two measurement regions, each measurement region corresponding to a portion of the scene represented in the sample images, determining contrast information as a ratio of a brightest pixel value within each measurement region to a darkest pixel value within each measurement region, and assigning the contrast value to a plurality of pixels within each measurement region; and combining image information from all of the sample images, on a measurement region by measurement region basis, based upon which sample image exhibits the maximum contrast for that measurement region, to construct the composite image.

13. The computer-readable medium of claim 12, wherein the sample images are digital images.

14. The computer-readable medium of claim 12, wherein the sample images are photographic images.

15. A system for constructing a composite image of a three dimensional scene, the system comprising:

an array of sensor locations defining an image plane, each sensor location being adapted for sensing radiation, and for producing radiation information including a brightest pixel value and a darkest pixel value;

an imaging system for focusing on the image plane an image of points a focus distance away from the image plane, the imaging system being movably coupled to the array such that the array is mounted along an d generally orthogonal to a central axis of the imaging system;

a motor coupled to the imaging system and to the array for, in response to a command signal, changing the distance between the imaging system and the array, such as to change the focus distance; and a processor module coupled to the array and to the motor, for:

sending command signals to the motor to cause it to change the focus distance;

receiving radiation information from each of the sensor locations; and constructing a composite image by calculating a contrast value as a ratio of the brightest pixel value within the sensor location to the darkest pixel value within the sensor location, assigning the calculated contrast value to a plurality of pixels within the sensor location, and incorporating into said composite image, for each sensor location, radiation information from that focus distance which produces the maximum contrast.

16. The system of claim 15, wherein the imaging system comprises one of a lens system and a mirror system.

17. The system of claim 15, wherein the radiation is sensed at each sensing location by one of a Charge Coupled Device (CCD) cell, a photosensitive film region, and an X-ray film region.

18. The system of claim 15, wherein the radiation is one of visible light and X-ray radiation.

* * * * *

UNITED STATES PATENT AND TRADEMARK OFFICE
CERTIFICATE OF CORRECTION

PATENT NO.   : 6,320,979 B1
DATED        : November 20, 2001
INVENTOR(S)  : Roger D. Melen It is certified that error appears in the above-identified patent and that said Letters Patent is hereby corrected as shown below:

<u>Title page,</u>
Item [56], References Cited, OTHER PUBLICATIONS, "2.htmn," should read
-- 2.html, --.

<u>Column 4,</u>
Line 10, "cause" should read -- causes --.

<u>Column 6,</u>
Line 49, "and" should be deleted.

<u>Column 8,</u>
Line 18, "an d" should read -- and --.

Signed and Sealed this

Twenty-third Day of April, 2002

*Attest:*

JAMES E. ROGAN
*Attesting Officer*  *Director of the United States Patent and Trademark Office*